(12) United States Patent
Chen et al.

(10) Patent No.: US 9,854,584 B1
(45) Date of Patent: Dec. 26, 2017

(54) WIRELESS COMMUNICATION CONNECTING SYSTEM AND METHOD

(71) Applicant: HON HAI PRECISION INDUSTRY CO., LTD., New Taipei (TW)

(72) Inventors: Po-Hsiang Chen, New Taipei (TW); Yu-Wen Chen, New Taipei (TW); You-Yun Lee, New Taipei (TW); Kai-Fan Lee, New Taipei (TW); Po-Cheng Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/242,621

(22) Filed: Aug. 22, 2016

(30) Foreign Application Priority Data

Aug. 4, 2016 (CN) .......................... 2016 1 0631694

(51) Int. Cl.
| | |
|---|---|
| *H04W 72/04* | (2009.01) |
| *H04M 1/725* | (2006.01) |
| *H04W 48/20* | (2009.01) |
| *H04W 72/02* | (2009.01) |
| *G06K 9/00* | (2006.01) |

(52) U.S. Cl.
CPC ........ *H04W 72/048* (2013.01); *G06K 9/0063* (2013.01); *H04M 1/72572* (2013.01); *H04W 48/20* (2013.01); *H04W 72/02* (2013.01); *H04W 72/046* (2013.01)

(58) Field of Classification Search
CPC ................................................... H04W 72/048
See application file for complete search history.

(56) References Cited

U.S. PATENT DOCUMENTS

| | | | | |
|---|---|---|---|---|
| 9,622,277 B1* | 4/2017 | Sun | ....................... | H04W 4/021 |
| 2004/0106436 A1* | 6/2004 | Ochi | .................... | H01Q 1/2258 |
| | | | | 455/562.1 |
| 2009/0243930 A1* | 10/2009 | Tien | ..................... | H01Q 1/1257 |
| | | | | 342/360 |
| 2011/0028099 A1* | 2/2011 | Cohen | ................... | H04W 40/18 |
| | | | | 455/63.4 |
| 2011/0212695 A1* | 9/2011 | Wild | ........................ | H01Q 3/26 |
| | | | | 455/73 |
| 2016/0044626 A1* | 2/2016 | Li | ........................ | H04W 64/00 |
| | | | | 455/456.1 |
| 2017/0195893 A1* | 7/2017 | Lee | ....................... | H04W 16/28 |

* cited by examiner

*Primary Examiner* — Christopher M Brandt
(74) *Attorney, Agent, or Firm* — ScienBiziP, P.C.

(57) ABSTRACT

A wireless communication connecting system includes a at least one wireless access point, a wireless electronic device, a position obtaining module, a position determining module, and a controlling module. A rotatable directional antenna is installed in the wireless electronic device. The position obtaining module determines first relative positions between each wireless access point and the wireless electronic device. A position determining module determines angles of relative positions between the directional antenna and each wireless access point according to a position information of the directional antenna and the first relative positions. The controlling module controls the directional antenna to point to the strongest-signal wireless access point. A wireless communication connecting system method is also disclosed.

20 Claims, 4 Drawing Sheets

WIRELESS COMMUNICATION CONNECTING SYSTEM AND METHOD

CROSS-REFERENCE TO RELATED APPLICATIONS

This application claims priority to Chinese Patent Application No. 201610631694.8, filed on Aug. 4, 2016, the contents of which are incorporated by reference herein.

FIELD

The subject matter herein generally relates to wireless communications.

BACKGROUND

Antennas are widely used in portable electronic devices for receiving wireless signals from wireless access points. The antenna can have directional property. In order to keep excellent connection between the portable electronic device and the wireless access point, many wireless access points of an area may be positioned in a number of directions.

BRIEF DESCRIPTION OF THE DRAWINGS

Implementations of the present technology will now be described, by way of example only, with reference to the attached figures.

DETAILED DESCRIPTION

Figure 1:
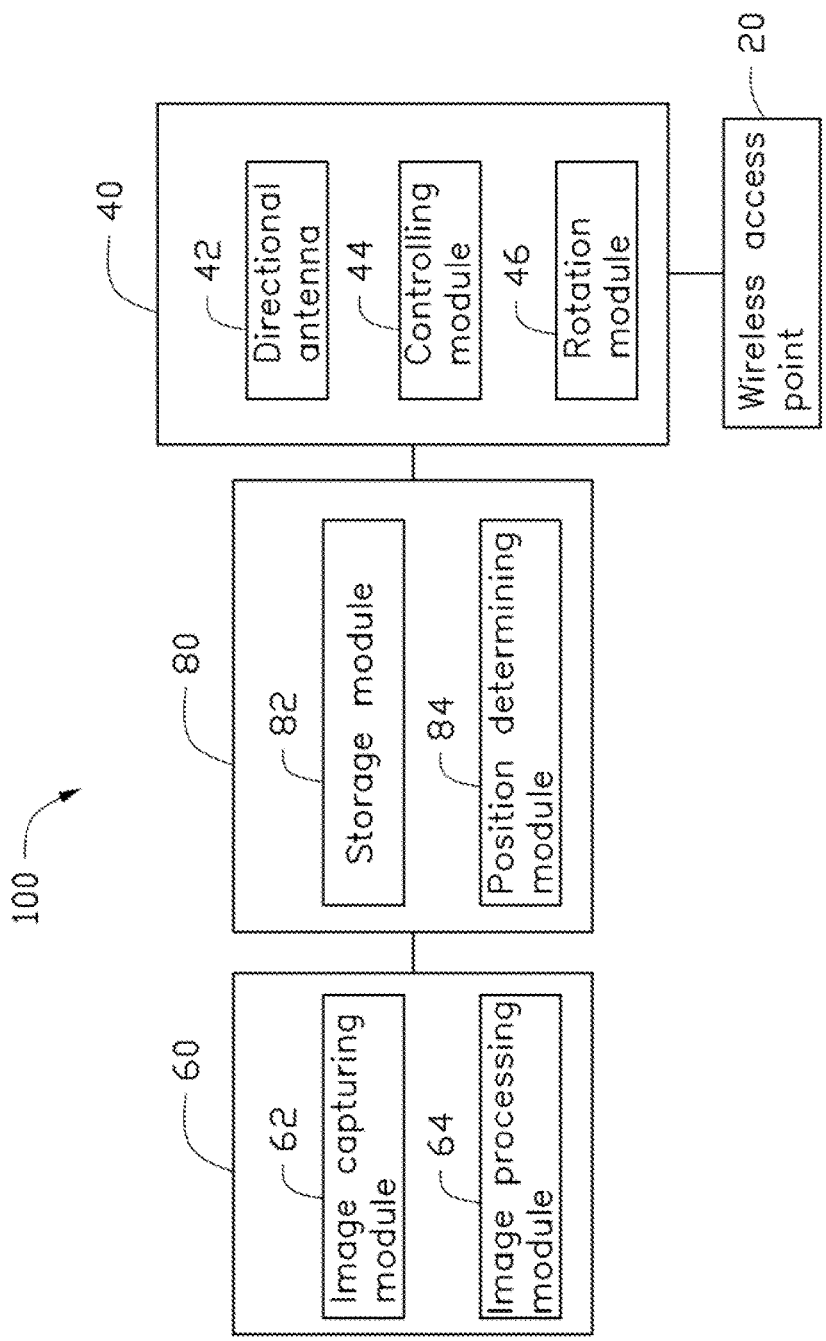
FIG. 1 is a block diagram of a wireless communication connecting system according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series, and the like.

The instant disclosure provides a wireless communication connecting system 100. FIG. 1 illustrates the wireless communication connecting system 100 as including at least one wireless access point 20 and a wireless electronic device 40, for example, a portable computer having wireless function.

The wireless communication connecting system 100 provides an excellent connection between the wireless electronic device 40 and the wireless access point 20.

The wireless communication connecting system 100 includes a position obtaining module 60 and a server 80. The position obtaining module 60 is configured to determine first relative positions between each wireless access point 20 and the wireless electronic device 40. In the embodiment, the position obtaining module 60 includes an image capturing module 62 and an image processing module 64. The image processing module 64 communicates with the image capturing module 62 and the server 80. The image capturing module 62 is configured to capture images of an area including the wireless electronic device 40 at a preset speed. The area has the wireless access point 20. The image processing module 64 is configured to determine the first relative position between each wireless access point 20 and the wireless electronic device 40 according to the last captured image and a stored image which indicates where each wireless access point 20 is positioned in the area. In another embodiment, the position capturing module 60 provides a user interface for inputting the first relative position between each wireless access point 20 and the wireless electronic device 40. The user interface can be on a display of the wireless electronic device 40.

The wireless electronic device 40 includes a directional antenna 42 The server 40 includes a storage module 82 and a position determining module 84. The storage module 82 stores a position information of the directional antenna 42 in the wireless electronic device 40. The position determining module 84 is configured to determine second relative positions between the directional antenna 42 and each wireless access point 20 according to the position information and the first relative positions. The second relative position includes a relative angle between the directional antenna 42 and the wireless access point 20. In another embodiment, the storage module 82 and the position determining module 84 can be set in the wireless electronic device 40.

The wireless electronic device 40 further includes a controlling module 44 and a rotation module 46. The rotation module 46 is rottatably connected to the directional antenna 42. The controlling module 44 is configured to control the rotation module 46 to rotate to make the directional antenna 42 point to one of the wireless access point 20.

Figure 2:
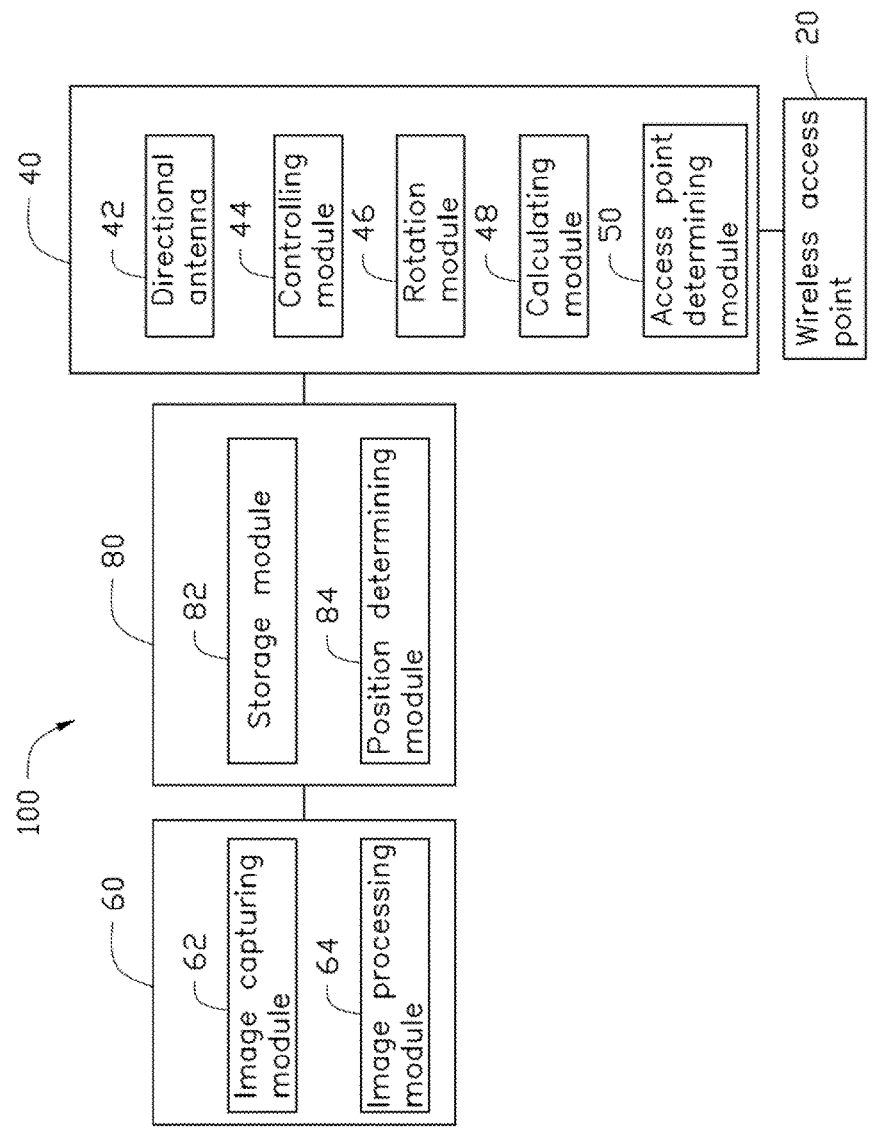
FIG. 2 is a block diagram of a wireless communication connecting system according to a second embodiment.

FIG. 2 illustrates the wireless electronic device 40 as further including a calculating module 48 and an access point determining module 50. Each wireless access point 20 transmits information as to data flow to the server 80. The calculating module 48 calculates data flows of the wireless electronic device 40 if the wireless electronic device 40 connects to each wireless access point 20 according to the data flow information of each wireless access point 20 and the second relative position between the directional antenna 42 and each wireless access point 20. The second relative position includes a distance between the directional antenna 42 and the wireless access point 20. The access point determining module 50 is configured to determine which wireless access point 20 provides strongest signal to the directional antenna 42 according to the data flows. In another embodiment, the calculating module 48 and the access point determining module 50 can be set in the server 80. The controlling module 44 is configured to control the rotation module 46 to rotate to point the directional antenna 42 at the determined wireless access point 20 according to the relative angle between the determined wireless access point 20 and the directional antenna 42.

Figure 3:
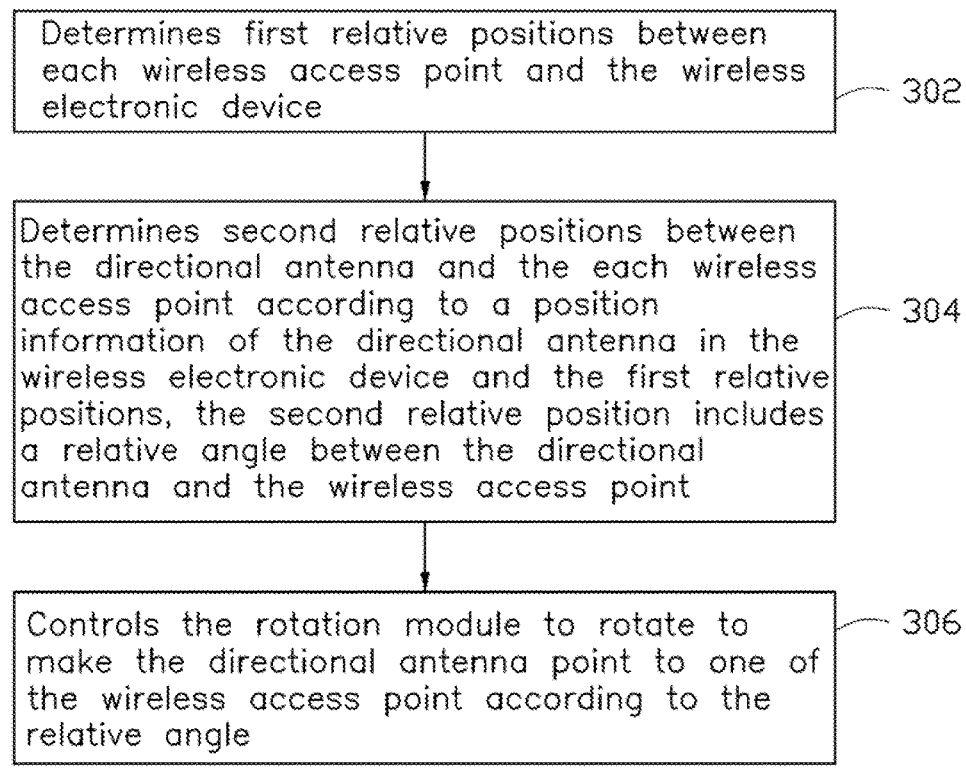
FIG. 3 is a flowchart of a wireless communication connecting method according to an embodiment.

FIG. 3 illustrates a wireless communication connecting method according to an embodiment. The method is employed in the wireless communication connecting system 100. The order of blocks in FIG. 3 is illustrative only and the order of the blocks can change. Additional blocks can be added or fewer blocks may be utilized without departing from this disclosure. The exemplary method begins at block 302.

At block 302, the position obtaining module 60 determines first relative positions between each wireless access point 20 and the wireless electronic device 40.

At block 304, the position determining module 84 determines second relative positions between the directional antenna and the each wireless access point according to a position information of the directional antenna 42 in the wireless electronic device and the first relative positions. The second relative position includes a relative angle between the directional antenna 42 and the wireless access point 20.

At block 306, the controlling module 44 controls the rotation module 46 to rotate to point the directional antenna 42 at one of the wireless access point 20 according to the relative angle.

Figure 4:
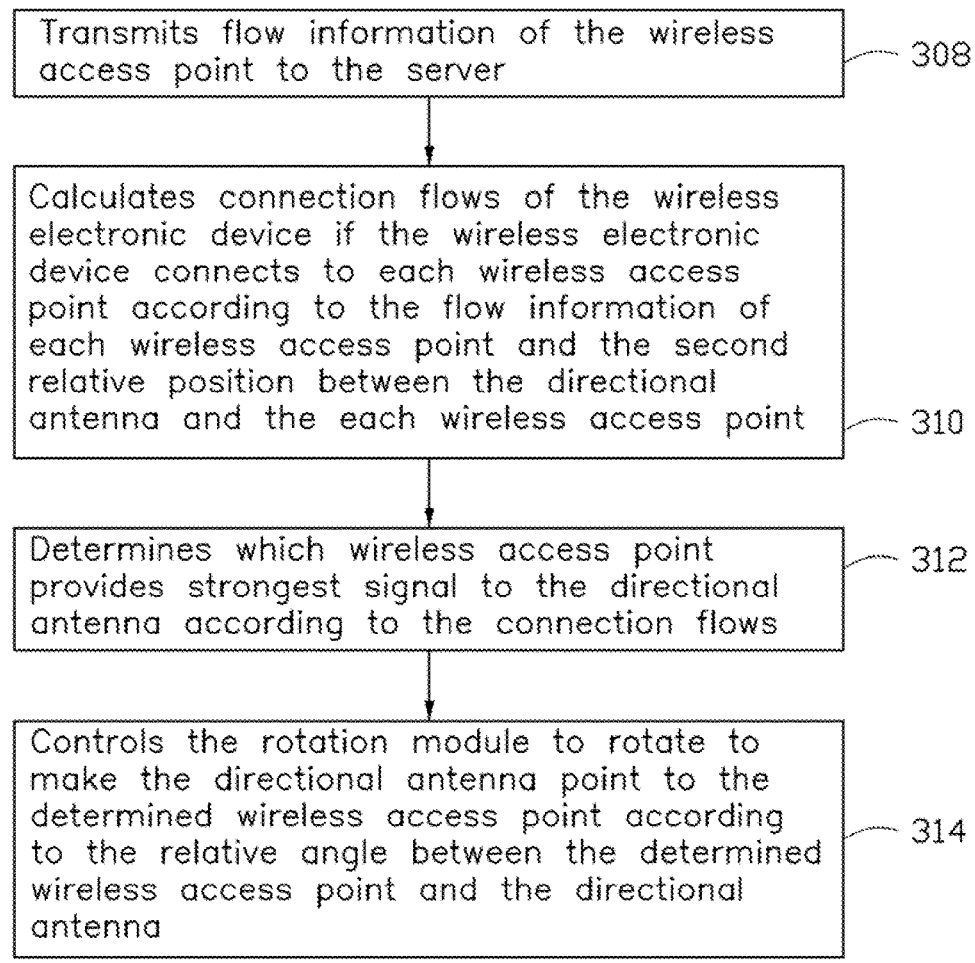
FIG. 4 shows a flowchart of block 306 of the wireless communication connecting method in FIG. 3.

FIG. 4 illustrates block 306 as including the following blocks according to an embodiment.

At block 308, each wireless access point 20 transmits information as to data flow of the wireless access point 20 to the server.

At block 310, the calculating module 48 calculates data flows of the wireless electronic device 40 if the wireless electronic device 40 connects to each wireless access point 20 according to the data flow information of each wireless access point 20 and the second relative position between the directional antenna 42 and each wireless access point 20. The second relative position includes a distance between the directional antenna 42 and each wireless access point 20.

At block 312, the access point determining module 50 determines which wireless access point 20 provides strongest signal to the directional antenna 42.

At block 314, the controlling module 44 controls the rotation module 46 to rotate to point the directional antenna 42 at the determined wireless access point 20 according to the relative angle between the determined wireless access point 20 and the directional antenna 42.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A wireless communication connecting system comprising:
   at least one wireless access point;
   a wireless electronic device comprising a directional antenna and a rotation structure rotatably connected to the directional antenna;
   a position obtaining module configured to determine first relative positions between each wireless access point and the wireless electronic device;
   a storage module storing a position information of the directional antenna in the wireless electronic device;
   a position determining module configured to determine second relative positions between the directional antenna and each wireless access point according to the position information and the first relative positions, the second relative position comprises a relative angle between the directional antenna and the wireless access point;
   a controlling module configured to control the rotation structure to rotate to make the directional antenna point to one of the wireless access point according to the relative angle; and
   at least one processor for executing programs associated with at least one of the position obtaining module, the storage module, the position determining module, and the controlling module.

2. The wireless communication connecting system as claimed in claim 1, wherein the position obtaining module comprises an image capturing module and an image processing module, the image capturing module captures an image of an area comprising the wireless electronic device, the area has the wireless access point, the image processing module determines the first relative position between each wireless access point and the wireless electronic device according to the captured image and a stored image which indicates where each wireless access point is position in the area.

3. The wireless communication connecting system as claimed in claim 2, wherein the image capturing module captures the image of an area at a preset speed, the image processing module determines the first relative position between each wireless access point and the wireless electronic device according to the last captured image and a stored image which indicates where each wireless access point is position in the area.

4. The wireless communication connecting system as claimed in claim 1, wherein the position capturing module provides a user interface for inputting the first relative position between each wireless access point and the wireless electronic device.

5. The wireless communication connecting system as claimed in claim 4, wherein the user interface is provided on a display of the wireless electronic device.

6. The wireless communication connecting system as claimed in claim 1, further comprising:
   a server for receiving flow information of each wireless access point transmitted from each wireless access point and determining which wireless access point providing strongest signal to the directional antenna according to the flow information.

7. The wireless communication connecting system as claimed in claim 6, wherein the server comprises a calculating module and an access point determining module, the calculating module calculates connection flows of the wireless electronic device if the wireless electronic device connects to each wireless access point according to the flow information of each wireless access point and the second relative position, the access point determining module determines which wireless access point provides strongest signal to the directional antenna according to the connection flows.

8. The wireless communication connecting system as claimed in claim 7, wherein the second relative position comprises a distance between the directional antenna and the wireless access point.

9. The wireless communication connecting system as claimed in claim 7, wherein the calculating module and the access point determining module are set in the wireless electronic device.

10. A wireless communication connecting system comprising:
- at least one wireless access point;
- a directional antenna rotatably installed in a wireless electronic device;
- a position obtaining module configured to determine first relative positions between each wireless access point and the wireless electronic device;
- a storage module storing a position information of the directional antenna in the wireless electronic device;
- a position determining module configured to determine second relative positions between the directional antenna and each wireless access point according to the position information and the first relative positions, the second relative position comprises a relative angle between the directional antenna and the wireless access point; and
- a controlling module configured to control the directional antenna to rotate to point to one of the wireless access point according to the relative angle; and
- at least one processor for executing programs associated with at least one of the position obtaining module, the storage module, the position determining module, and the controlling module.

11. The wireless communication connecting system as claimed in claim 10, wherein the position obtaining module comprises an image capturing module and an image processing module, the image capturing module captures an image of an area comprising the wireless electronic device, the area has the wireless access point, the image processing module determines the first relative position between each wireless access point and the wireless electronic device according to the captured image and a stored image which indicates where each wireless access point is position in the area.

12. The wireless communication connecting system as claimed in claim 11, wherein the image capturing module captures the image of an area at a preset speed, the image processing module determines the first relative position between each wireless access point and the wireless electronic device according to the last captured image and a stored image which indicates where each wireless access point is position in the area.

13. The wireless communication connecting system as claimed in claim 10, wherein the position capturing module provides a user interface for inputting the first relative position between each wireless access point and the wireless electronic device.

14. The wireless communication connecting system as claimed in claim 13, wherein the user interface is provided on a display of the wireless electronic device.

15. The wireless communication connecting system as claimed in claim 10, further comprising:
- a server for receiving flow information of each wireless access point transmitted from each wireless access point and determining which wireless access point providing strongest signal to the directional antenna according to the flow information.

16. The wireless communication connecting system as claimed in claim 15, wherein the server comprises a calculating module and an access point determining module, the calculating module calculates connection flows of the wireless electronic device if the wireless electronic device connects to each wireless access point according to the flow information of each wireless access point and the second relative position, the access point determining module determines which wireless access point provides strongest signal to the directional antenna according to the connection flows.

17. The wireless communication connecting system as claimed in claim 16, wherein the second relative position comprises a distance between the directional antenna and the wireless access point.

18. A wireless communication connecting method comprising:
- determining first relative positions between at least one wireless access point and a wireless electronic device comprising a directional antenna, the directional antenna rotatably installed in the wireless electronic device;
- determining second relative positions between the directional antenna and each wireless access point according to a position information of the directional antenna in the wireless electronic device and the first relative positions, the second relative position comprises a relative angle between the directional antenna and the wireless access point; and
- controlling the directional antenna to rotate to point to one of the wireless access point according to the relative angle.

19. The wireless communication connecting method as claimed in claim 18, wherein controlling the directional antenna to rotate to point to one of the wireless access point according to the relative angle comprising:
- transmitting flow information of each wireless access point;
- calculating connection flows of the wireless electronic device if the wireless electronic device connects to each wireless access point according to the flow information of each wireless access point and the second relative position between the directional antenna and each wireless access point;
- determining which wireless access point provides strongest signal to the directional antenna according to the connection flows; and
- controlling the directional antenna to rotate to point to the determined wireless access point according to the relative angle between the determined wireless access point and the directional antenna.

20. The wireless communication connecting method as claimed in claim 19, wherein the second relative position comprises a distance between the directional antenna and each wireless access point.

* * * * *